United States Patent [19]

Robeson et al.

[11] Patent Number: 4,939,228

[45] Date of Patent: Jul. 3, 1990

[54] POLYARYLETHERSULFONE POLYMER SOLUTION

[75] Inventors: Lloyd M. Robeson, Whitehouse Station; Louis M. Maresca, Belle Mead, both of N.J.

[73] Assignee: Amoco Corporation, Chicago, Ill.

[21] Appl. No.: 225,491

[22] Filed: Jul. 28, 1988

Related U.S. Application Data

[62] Division of Ser. No. 80,729, Aug. 3, 1987, abandoned, which is a division of Ser. No. 536,843, Sep. 29, 1983, abandoned.

[51] Int. Cl.$^5$ .................. C08G 8/02; C08G 14/00
[52] U.S. Cl. .................. 528/171; 528/125; 528/126; 528/128; 528/174; 528/219

[58] Field of Search .............. 528/171, 125, 126, 128, 528/219, 174

[56] References Cited

U.S. PATENT DOCUMENTS 3,993,843  11/1976  Vasta .................................. 428/422

Primary Examiner—John Kight, III
Assistant Examiner—M. L. Moore
Attorney, Agent, or Firm—William H. Magidson; Ralph C. Medhurst

[57] ABSTRACT

Described herein are solutions for coating compositions comprising at least one select polyarylethersulfone dissolved in a solvent comprising methylene chloride or N,N-dimethylformamide. These solutions are useful for preparing films, adhesives anisotropic membranes or hollow fibers.

5 Claims, No Drawings

POLYARYLETHERSULFONE POLYMER SOLUTION

This is a continuation of application Ser. No. 07/080,729 filed Aug. 3, 1987 which is a continuation of Ser. No. 536,843 filed Sept. 29, 1983 both now abandoned.

BACKGROUND OF THE INVENTION

This invention is directed to a solution for coating comprising at least one select polyarylethersulfone dissolved in a solvent comprising methylene chloride or N,N-dimethylformamide.

Polyarylethersulfones containing the following repeat unit:

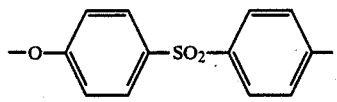

are commercially available polymers which have a wide variety of end-use applications including the ability to be cast into films. However, one of the disadvantages of the polyarylethersulfone, containing solely the above repeat unit, is the lack of low temperature boiling solvents from which cast films or adhesive solutions can be prepared. U.S. Pat. No. 3,875,103 states that the above polyarylethersulfone has instability in solvents such as methylene chloride leading to short shelf-life (column 1, lines 11 to 23). The patent states that cyclic aliphatic ketones are good solvents for the polyarylethersulfone and the resulting solutions have good shelf-life. However, methylene chloride is an inexpensive, non-toxic and widely used low boiling solvent, it would be advantageous if the polyarylethersulfone could be dissolved in it and the resulting solution retain shelf-life.

Further, the polyarylethersulfone, containing solely the above repeat unit, does not exhibit stable solutions with N,N-dimethylformamide, a water soluble solvent, which is of interest if a solution of the polyarylethersulfone is to be coagulated in water. Specifically, anisotropic membrane production would be of interest utilizing solutions of the polyarylethersulfone. As polyarylethersulfones are commercially utilized as membrane for gas separation as well as reverse osmosis applications, the solutions in N,N-dimethylformamide would be useful for such applications.

It has been found that the select polyarylethersulfone of this invention exhibit solubility in N,N-dimethylformamide.

Another commercially available polyarylethersulfone contains the following repeat unit:

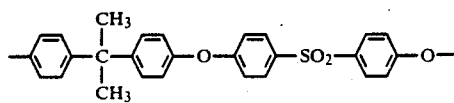

This polyarylethersulfone exhibits excellent solubility in a wide range of solvents including methylene chloride and N,N-dimethylformamide. However, a precipitate forms with methylene chloride (it takes several weeks) which must be filtered out if homogeneous films are to be prepared. The precipitate has been characterized as a cyclic dimer which crystallizes out of solution. The polyarylethersulfones of this invention have not been observed to form a precipitate with methylene chloride.

A polyarylethersulfone containing repeat units of the following structure:

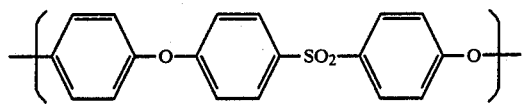

is not soluble in methylene chloride but swells and rapidly crystallizes when placed in contact with methylene chloride.

Thus, it can be seen that polymers made up of units of the following formula:

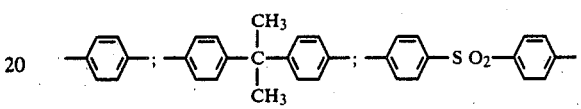

when independently combined with the following unit:

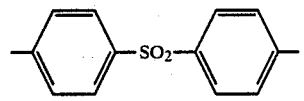

when connected with —O— units do not exhibit solution stability with methylene chloride; yielding either a gelatinous material which is non-pourable or a precipitate which interfers with homogeneous film preparation.

It has now been found that the combination of two (or more) of the above units with the following unit:

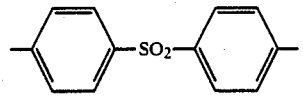

connected with —O— units yield polymers with significantly improved solution stability in methylene chloride and N,N-dimethylformamide. Also, the resultant polyarylethersulfones of this invention have excellent solution stability after extended storage time in both methylene chloride and N,N-dimethylformamide.

DESCRIPTION OF THE INVENTION

This invention is directed to a solution for coating comprising at least one select polyarylethersulfone dissolved in a solvent comprising methylene chloride or N,N-dimethylformamide.

The polyarylethersulfones of this invention are amorphous thermoplastic polymers containing units of the formula:

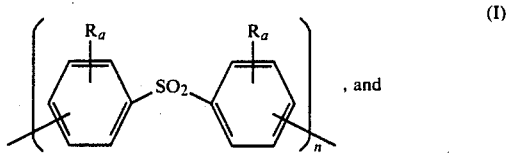

, and

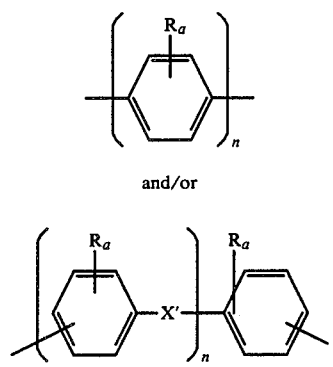

and/or

wherein R is independently hydrogen, $C_1$ to $C_6$ alkyl or $C_4$ or $C_8$ cycloalkyl, X' is independently $$-\overset{R_1}{\underset{R_2}{C}}-$$

wherein $R_1$ and $R_2$ are independently hydrogen or $C_1$ to $C_9$ alkyl, or

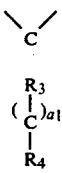

wherein $R_3$ and $R_4$ are independently hydrogen or $C_1$ to $C_8$ alkyl, and $a_1$ is an integer of 3 to 8; —S—, or —O—, a is an integer of 0 to 4 and n is independently an integer of 1 to 3 and wherein the ratio of unit (I) to the sum of units (II) and/or (III) is greater than 1. The units are attached to each other by an —O— bond.

A preferred polymer of this invention contains units of the formula:

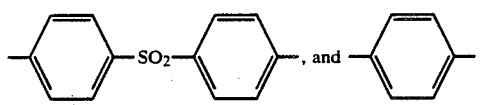

Another preferred polyarylethersulfone of this invention contains units of the formula:

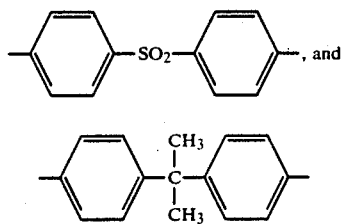

These units are attached to each other by an —O— bond. The polyarylethersulfone may be random or may have an ordered structure.

The polyarylethersulfones of this invention have a reduced viscosity of from about 0.4 to greater than about 2.5, as measured in N-methylpyrrolidone, or other suitable solvent, at 25° C.

The polyarylethersulfones of this invention are prepared by reacting the monomers represented by the following formulae:

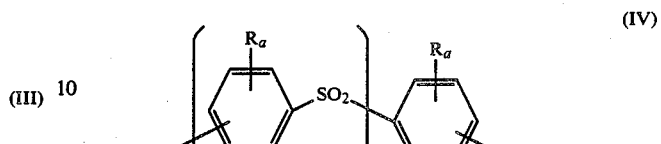

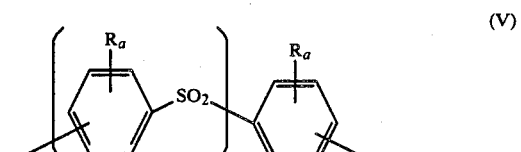

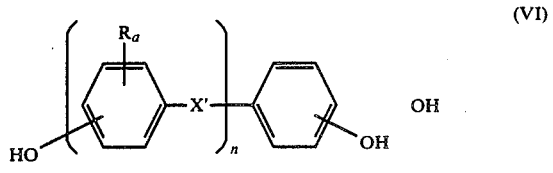

and/or

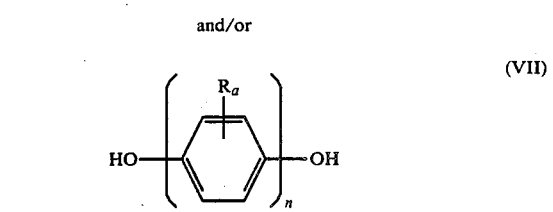

wherein R, a, X' and n are as previously defined, and X and Y are independently selected from Cl, Br, F, $NO_2$ or OH.

The ratio of the concentration of OH groups to Cl, Br, F and/or $NO_2$ groups used to form the polyarylethersulfone is from about 0.90 to about 1.10, preferably from about 0.98 to about 1.02.

The monomers, represented by formulas (IV), (V), (VI) and (VII), include the following:

2,2-bis(4-hydroxyphenyl)propane,
bis(4-hydroxyphenyl)methane,
4,4'-dihydroxydiphenyl sulfide,
4,4'-dihydroxydiphenyl ether,
4,4'-dihydroxydiphenyl sulfone,
2,4'-dihydroxydiphenyl sulfone,
4,4'-dichlorodiphenyl sulfone,
4,4'-dinitrodiphenyl sulfone,
4-chloro-4'-hydroxydiphenyl sulfone, 4,4'-biphenol, hydroquinone, and the like.

The preferred monomers include hydroquinone, 4,4-biphenol, 2,2-bis(4-hydroxyphenyl)propane, 4,4'-dichlorodiphenyl sulfone, and 4,4'-dihydroxydiphenyl sulfone or 4 chloro-4'-hydroxydiphenyl sulfone.

The polymers of this invention are prepared by contacting substantially equimolar amounts of the hydroxy containing compounds (depicted in formulas (IV) to (VII) supra) and halo and/or nitro containing compounds (depicted in formula (IV) and (V) supra) with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization and a polar aprotic solvent.

The temperature of the reaction mixture is kept at from about 120° to about 180° C. for about 1 to about 5 hours and then raised and kept at from about 200° to about 250° C., preferably from about 210° to about 230° C. for about 1 to 10 hours.

The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of polyarylethersulfones and include sulfur containing solvents such as those of the formula:

$$R_5-S(O)_b-R_5$$

in which each $R_5$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

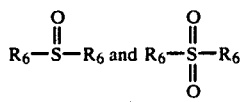

where the $R_6$ groups are independently lower alkyl, such as methyl, ethyl, propyl, butyl, and like groups, and aryl groups such as phenyl and alkylphenyl groups such as the tolyl group, as well as those where the $R_6$ groups are interconnected as in a divalent alkylene bridge such as:

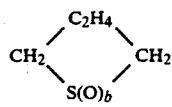

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include N,N-dimethylacetamide, N,N'-dimethylformamide and N-methylpyrrolidone.

The azeotrope forming solvent and polar aprotic solvent are used in a weight ratio of from about 1:10 to about 1:1, preferably from about 1:7 to about 1:5.

In the reaction, the hydroxy containing compound is slowly converted, in situ, to the alkali metal salt thereof by reacting with the alkali metal carbonate. The alkali metal carbonate is preferably potassium carbonate. Mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only lower molecular weight products are secured. Consequently, in order to secure the high polymers, the system should be substantially anhydrous, and preferably contain less than 0.5 percent by weight water during the reaction.

Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

The polyarylethersulfone is dissolved in the methylene chloride or N,N-dimethylformamide in concentrations of from 1 to 50 g. in 100 cm³ of the methylene chloride or N,N-dimethylformamide.

Additionally, up to about fifty percent of the methylene chloride can be replaced with a polar or aromatic solvent such as chlorobenzene. With N,N-dimethylformamide solution additional water soluble solvents (e.g., N,N-dimethylacetamide) may be used.

EXAMPLES

The following examples serve to give specific illustrations of the practice of this invention but they are not intended in any way to limit the scope of this invention.

The following designations used in the Examples have the following meaning:

Polyarylethersulfone I: A polymer having the following repeating unit:

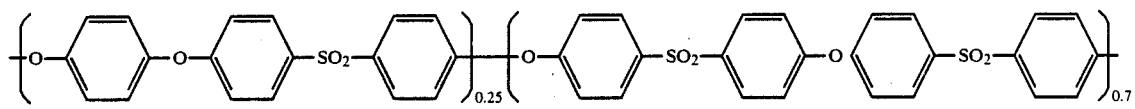

The polymer has a reduced viscosity of 0.49 dl/g as measured in chloroform (0.2 g/100 ml) at 25° C.

Polyarylethersulfone II: A polymer having the following repeat unit:

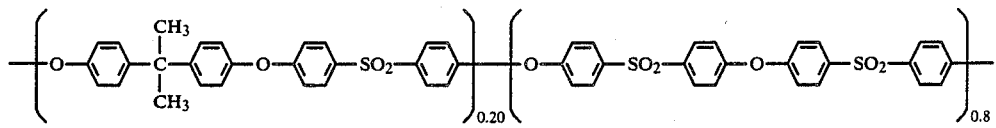

Polyethersulfone: A polymer having the following repeat unit:

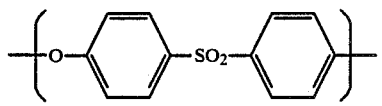

The polymer has a reduced viscosity of 0.48 dl/g as measured in N-methyl pyrrolidone (0.2 g/100 ml) at 25° C.

CONTROL A

Twenty grams of Polyethersulfone were placed in a container with 90 ml of methylene chloride. The Polyethersulfone only partially dissolved, and after 24 hours, the dissolved Polyethersulfone precipitated, leaving an opaque, gelatinous mass.

EXAMPLE 1

Twenty grams of Polyarylethersulfone I were placed in a container with 90 ml of methylene chloride. The polyarylethersulfone totally dissolved and after 2 months no precipitate was observed. Part of the solution was then poured onto a glass plate and a film was cast which exhibited excellent transparency. After 3 months, a gelatinous material was observed which could not be poured.

CONTROL B

Ten grams of Polyethersulfone were placed in a container with 90 ml of methylene chloride. The solution totally dissolved, but after 4 days the polymer came out of solution leaving a non-pourable gelatinous material.

EXAMPLE 2

Ten grams of Polyarylethersulfone I were placed in a container with 90 ml of methylene chloride. The solution totally dissolved, and after 2 months no precipitation was observed. The solution was then poured onto a glass plate, and after solvent evaporation a transparent film was removed.

CONTROL C

Five grams of Polyethersulfone were placed into a container with 90 ml of methylene chloride. The polymer totally dissolved; however, after 7 days it came out of solution and was a non-pourable, gelatinous material.

EXAMPLE 3

Five grams of Polyarylethersulfone I were placed into a container with 90 ml of methylene chloride. The polymer totally dissolved, and after 2 months no precipitation was observed. The solution was then poured onto a glass plate, and after solvent evaporation a transparent film was removed.

EXAMPLE 4

Twenty grams of a polyarylethersulfone II were placed into a container with 90 ml of methylene chloride. The polymer totally dissolved, and after 1 month no precipitation or gelation was observed. After two months, a gelatinous material resulted which could not be poured.

CONTROL D

Twenty grams of a polysulfone of structure

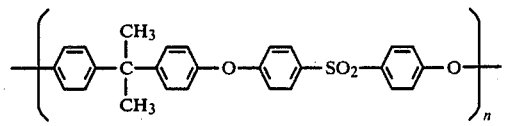

with a reduced viscosity of 0.48 dl/g as measured in chloroform (0.2 g/100 ml) at 25° C. were placed into a container with 90 ml. of methylene chloride. The polymer totally dissolved. After one month a fine precipitate was observed and continued to increase in size and concentration thereafter. This precipitation is believed due to the crystallization of a cyclic dimer of the above structure from solution.

CONTROL E

Twenty grams of a polyarylethersulfone of the structure

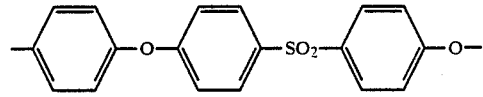

with a reduced viscosity of 0.42 dl/g as measured in N-methylpyrrolidone (0.2 g/100 ml) at 25° C. were placed into a container with 90 ml. of methylene chloride. The polymer never dissolved but swelled and crystallized.

These experiments note that the structures comprised of the following units

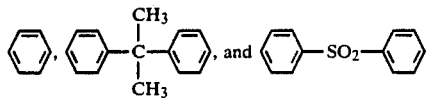

when individually combined with another unit of

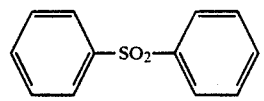

connected with —O— units do not yield stable solutions as evidenced by either formation of a gelatinuous mass or yielding a precipitate (e.g., cyclic dimer). However, when two of the three above noted units are combined with units of

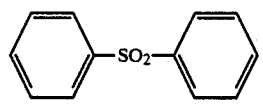

a stable solution results with much longer times required to yield gelatinous behavior and/or precipitate formation.

CONTROL F

Twenty grams of Polyethersulfone were placed in a container with 90 ml of N,N-dimethylformamide. The polymer never completely dissolved instead a gelatinous mass resulted which could not be poured.

EXAMPLE 5

Twenty grams of a Polyarylethersulfone I were placed in a container with 90 ml. of N,N-dimethylformamide. The polymer completely dissolved and remained a stable, pourable solution for over two months.

What is claimed is:

1. A solution for coating, comprising polyarylethersulfone containing units of the following formula:

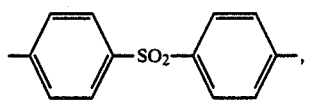

and

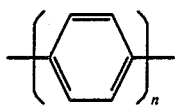

wherein n is independently an integer of 1 or 2 and wherein the ratio of unit (I) to unit (II) is greater than 1; wherein the units are attached to each other by an —O— bond; said polymer produced by the reaction of at least one of hydroquinone or biphenol, with at least two of dichlorodiphenyl sulfone, dihydroxydiphenyl sulfone and chlorohydroxydiphenyl sulfone; said polymer dissolved in a solvent comprising methylene chloride.

2. A solution as defined in claim 1, wherein the polyarylethersulfone has repeating units of the formula:

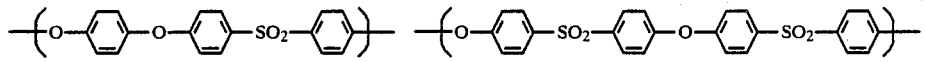

3. A solution as defined in claim 2, wherein the polyarylethersulfone has repeating units of the formula:

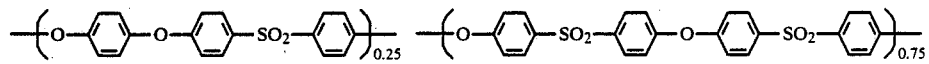

4. A solid film prepared by coating the solution of claim 1.

5. An anisotropic membrane or hollow fiber prepared by coagulation of the solution of claim 4 into an aqueous medium.

* * * * *

UNITED STATES PATENT AND TRADEMARK OFFICE
CERTIFICATE OF CORRECTION

PATENT NO. : 4,939,228

DATED : July 3, 1990

INVENTOR(S) : Lloyd M. Robeson and Louis M. Maresca

It is certified that error appears in the above-identified patent and that said Letters Patent is hereby corrected as shown below:

<u>Col.</u>     <u>Line</u>

3          29-35

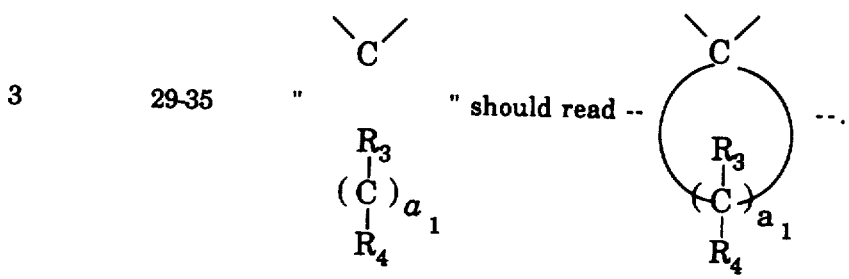

Signed and Sealed this

Eighteenth Day of February, 1992

Attest:

HARRY F. MANBECK, JR.

Attesting Officer          Commissioner of Patents and Trademarks